United States Patent [19]

Chiuaru et al.

[11] 4,095,700
[45] Jun. 20, 1978

[54] TURN-OVER DEVICE FOR SLAB MATERIALS

[75] Inventors: Dumitru Chiuaru; Nicolae Alexandru, both of Bucharest, Romania

[73] Assignee: Institutul Pentru Proiectari de Sectii si Uzine de Laminare — Iprolam, Bucharest, Romania

[21] Appl. No.: 777,151

[22] Filed: Mar. 11, 1977

Related U.S. Application Data

[63] Continuation-in-part of Ser. No. 755,209, Dec. 29, 1976, abandoned.

[30] Foreign Application Priority Data

Dec. 30, 1975 Romania .................................. 84386

[51] Int. Cl.² .............................................. B65G 7/00
[52] U.S. Cl. ................................ 214/1 QA; 198/403; 214/1 S; 214/130 R
[58] Field of Search ..................... 214/1 QA, 1 Q, 1 S, 214/130 R; 198/403

[56] References Cited

U.S. PATENT DOCUMENTS 3,581,910  6/1971  Field ................................. 214/1 QA

FOREIGN PATENT DOCUMENTS 432,943  11/1974  U.S.S.R. .......................... 214/1 QA

Primary Examiner—Frank E. Werner
Assistant Examiner—George F. Abraham
Attorney, Agent, or Firm—Karl F. Ross

[57] ABSTRACT

Two pairs of arms are parallel to and spaced apart from one another and lie beneath the path of a conveyor for advancing slab materials to be turned over, one pair of arms moves upwardly while remaining horizontal and engaging the slab whereupon the arms advance to a vertical position, followed by the other pair of arms which swing into a verical position in a sense opposite to that of the first pair of arms for receiving the slab and lowering it to the conveyor in a turned over position, both pairs of arms being driven through a series of articulated connecting rods and levers coupled to either electric or hydraulic drives.

6 Claims, 6 Drawing Figures

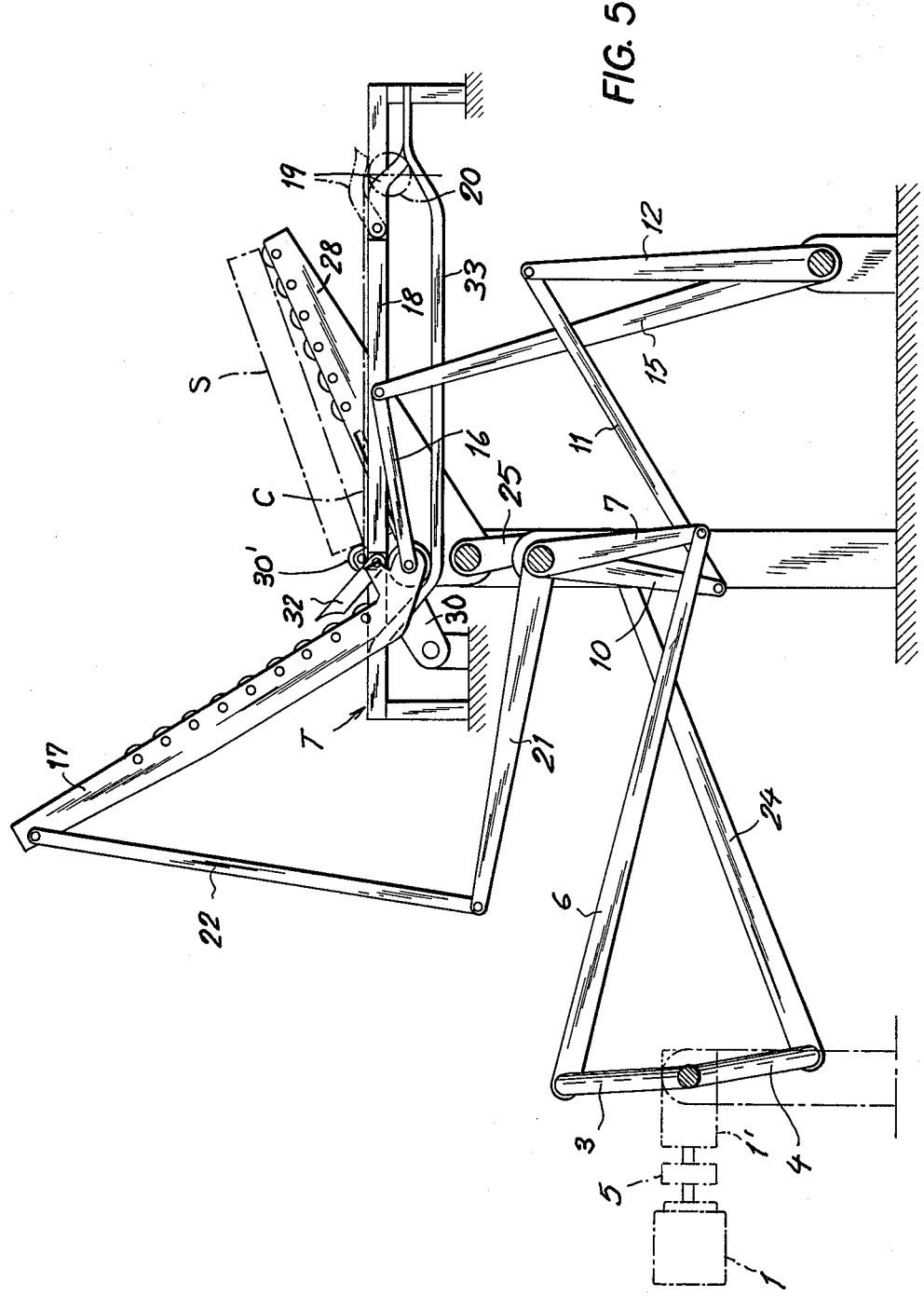

TURN-OVER DEVICE FOR SLAB MATERIALS

This application is a continuation-in-part of application Ser. No. 755,209, filed Dec. 29, 1976, now abandoned.

FIELD OF THE INVENTION

The invention relates to turn-over devices and, in particular, to a turn-over device for use in the steel industry for heavy slab materials, as well as for other purposes requiring turn-over operations.

BACKGROUND OF THE INVENTION

Turn-over devices for use in the steel industry are known and usually comprise a four wheel carriage running on two rails arranges transverse to the path of the conveyor. On the carriage, two tongues are mounted, each of them actuated by a hydraulic cylinder and an integral part of a two pinion shaft which gears in two racks, these also actuated by two other hydraulic cylinders. The carriage is advanced on the tracks by another hydraulic cylinder, independent of the first four.

The slab material to be turned over is engaged by the two tongues driven by the first two cylinders, turned over through 180° with the help of the other two cylinders which drive racks and pinions, and the fifth cylinder moves the carriage to the desired position where the slab is to be let down.

The drawbacks of these devices lie in the complexity and excessive sophistication of the structure; three distinct drives with five hydraulic cylinders requiring their own hydraulic station and the highly skilled personnel required to operate the device. Also, the device is not integrated physically into the conveyor line in which it serves and therefore occupies a large space on either side of the conveyor since it must move transversely thereto.

OBJECTS OF THE INVENTION

It is therefore an object of the invention to provide an improved turn-over device for the purposes described with simplicity of structure.

It is another object of the invention to provide a turn-over device having a single drive element.

It is still another object of the invention to provide a turn-over device, especially for a steelmill, which will turn the slab material within the boundaries of the conveyor path, i.e. in place.

It is yet another object of the invention to provide a turn-over device which does not require extensive space on either side of the conveyor line.

And another object of the invention is to provide a turn-over device which is easily integrated into the conveyor line, not requiring extensive hydraulic installations.

SUMMARY OF THE INVENTION

The above and other objects of the invention are realized in a system which comprises a first pair of movable arms lying in parallel but spaced-apart relationship just beneath the path of a roller or other type of conveyor used for advancing slab materials. The first pair of arms are flanked on their outer sides by a second pair of arms which are swingable in a coordinated relationship with the first pair of arms.

The first pair of arms are each provided with a wheel at one end of each arm which engages a track provided between each set of flanking first and second arms. Each track is provided with an upper and lower run which acts as a guide for the first pair of arms, which when advanced forward are guided upwardly while maintaining a horizontal orientation and into engagement with the slab to be turned over. Both pairs of arms are driven by a series of connecting rods and levers, articulated to a pair of rotating cranks which impart a reciprocal motion to the levers which in turn impart a repeating cyclical movement to the arms.

After engagement with the slab, the first pair of arms are swung into a vertical position by one of the connecting rods articulated to the front end thereof, while the rear end carrying the wheels is advanced forward along the upper run of the tracks by another connecting rod articulated to the rear end. In coordination with this movement of the first arms, the second pair of arms swings upwardly in a sense opposite to that of the first pair to receive the slab as the first pair of arms passes beyond the vertical position, and lowers the slab onto the conveyor in a turned over position. As the first pair of arms rides back along the track on its wheels, its wheels are switched to the lower run so that when the front end of the arms are lowered, the entire arm will lie below the path of the conveyer and in position to repeat the cycle.

BRIEF DESCRIPTION OF THE DRAWING

The specific details of the invention and the mode of functioning will be described in connection with the accompanying drawing wherein:

FIGS. 3-5 are views similar to that of FIG. 2 showing the device in different positions during its cycle; and FIG. 6 is a view similar to that of FIG. 2 showing a different drive element.

SPECIFIC DESCRIPTION

Figure 1:
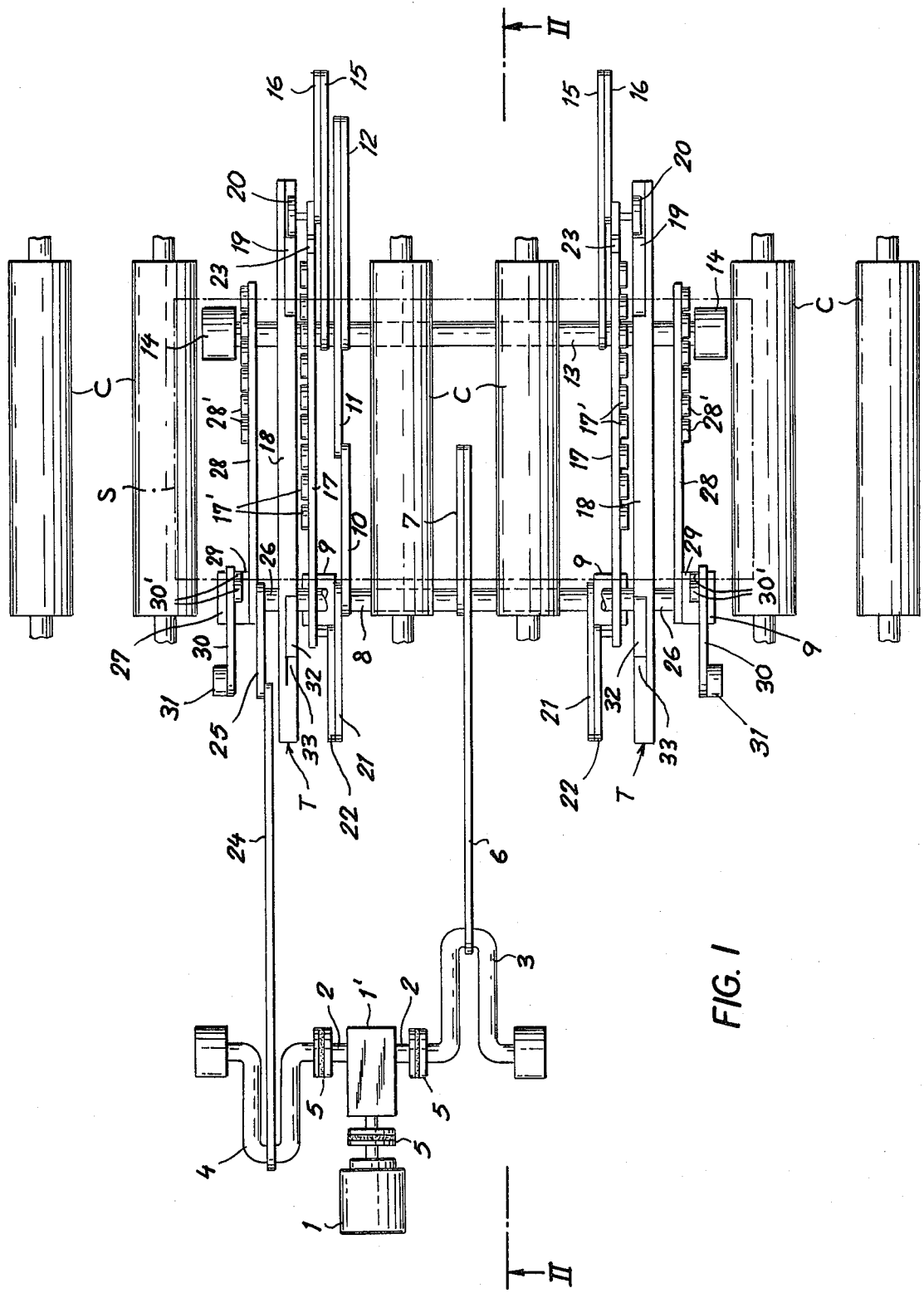
FIG. 1 is a top view of the device in position along a conveyer path.
Figure 2:
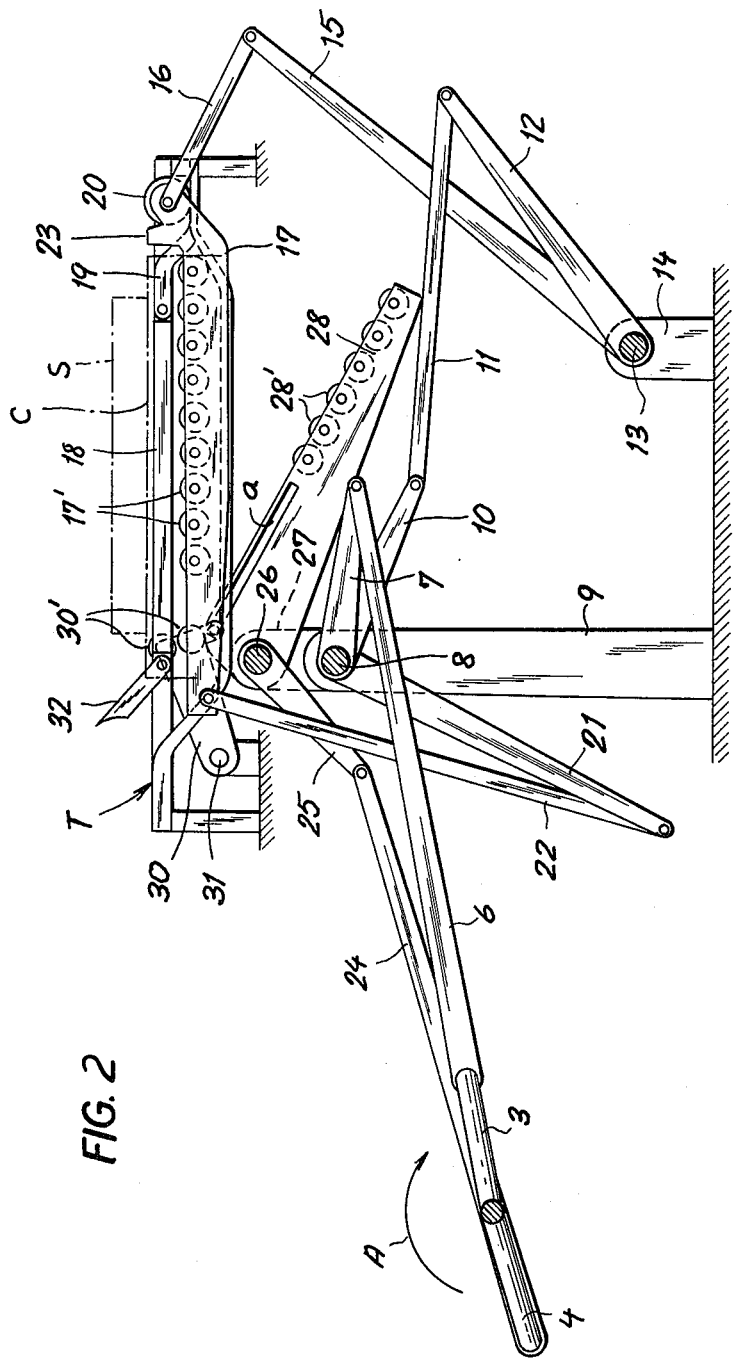
FIG. 2 is a sectional view taken along line II—II of FIG. 1.

Referring first to FIG. 2, it can be seen that a pair of cranks 3 and 4 are driven in the direction of arrow A by a motor 1 connected through a flexivle coupling 5 to a transmission 1' having a pair of output shafts 2 connected through additional flexible couplings 5 to the cranks 3 and 4, this drive arrangement being best seen in FIG. 1 and in FIG. 5 where it is shown in phantom lines.

The crank 3 is articulated to one end of a connecting rod 6 which has its other end articulated to a lever 7 fixedly mounted on a shaft 8 journaled for rotation in a pair of supports 9, by the lever 7.

A lever 10 is fixedly mounted on the shaft 8 and driven thereby to rotate another lever 12 articulated to the lever 10 by a connecting rod 11. The lever 12 in fixedly mounted on another shaft 13, journaled for rotation in supports 14. Another lever 15 is fixedly mounted on the shaft 13 for rotation thereby, imparting a linear movement to an arm 17 which is articulated to the lever 15 by a connecting rod 16, at the rear end of arm 17.

Another lever 21 is fixedly mounted on shaft 8 for rotation thereby, imparting a swinging movement to the arm 17 about its rear end, the arm 17 being articulated at its front end to the lever 21 by a connecting rod 22.

The crank 4 is articulated to a lever 25 by a connecting rod 24, the lever 25 being fixedly mounted on a shaft 26 journaled for rotation in supports 27, by the lever 25.

An arm 28 is fixedly mounted on the shaft 26 for rotation thereby.

Figure 3:
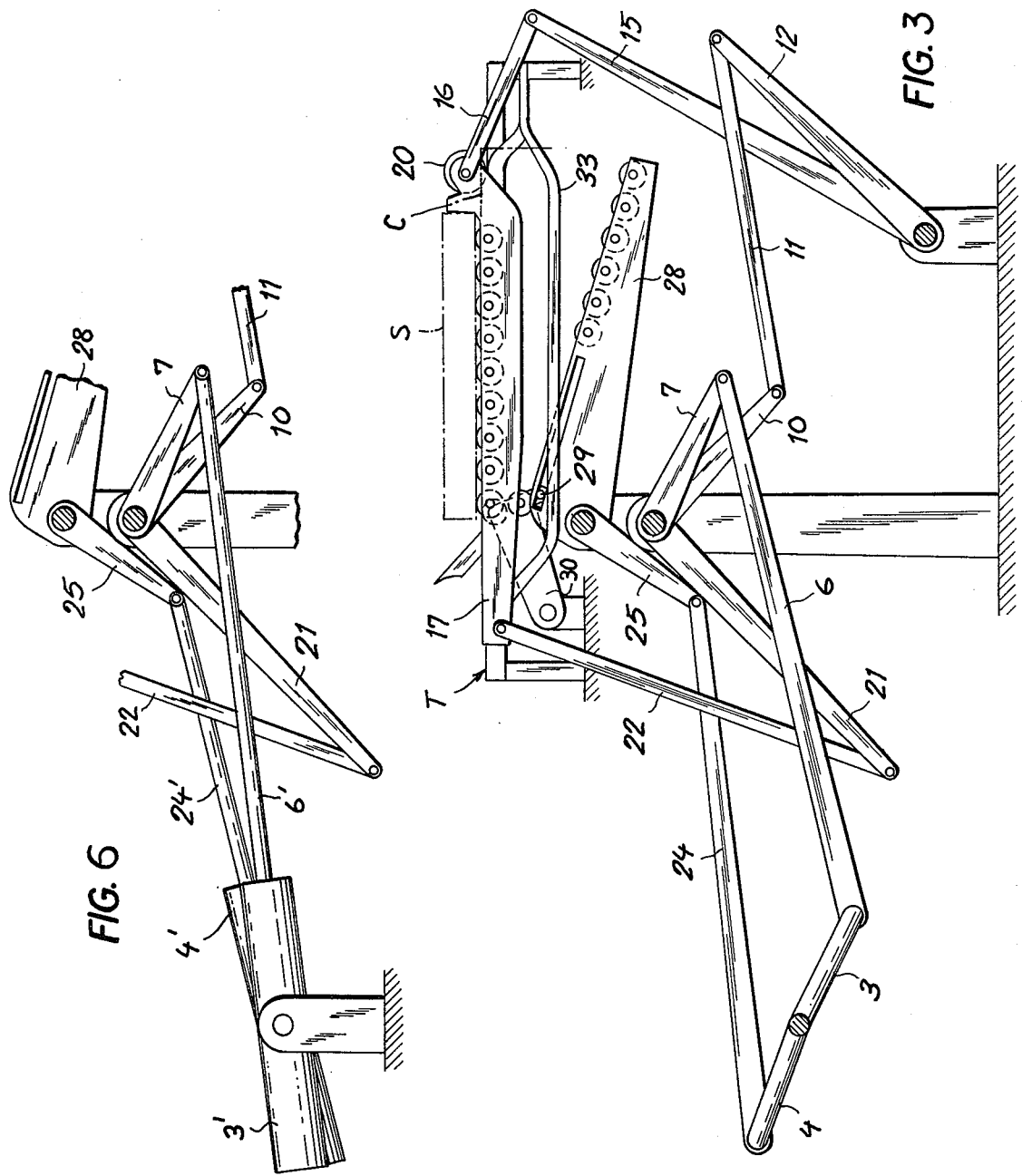

The arm 17 is provided at its rear end with a wheel 20 which is guided along a track T having an upper run 18 and a lower run 33. The arms 17 and 28 as well as the track T lie just beneath the path of a roller-type conveyor C used for advancing slabs S, as shown in phantom lines. As the arm 17 is advanced forward by the lever 15, it is guided onto the upper run 18 of track T by the wheel 20. At the same time, the front end of arm 17 is lifted by the connecting rod 22, so that the arm 17 remains horizontal as in moves into the path of the conveyor C and engages the slab S with a row of rollers 17' provided on the arm 17, as shown in FIG. 3.

Figure 4:
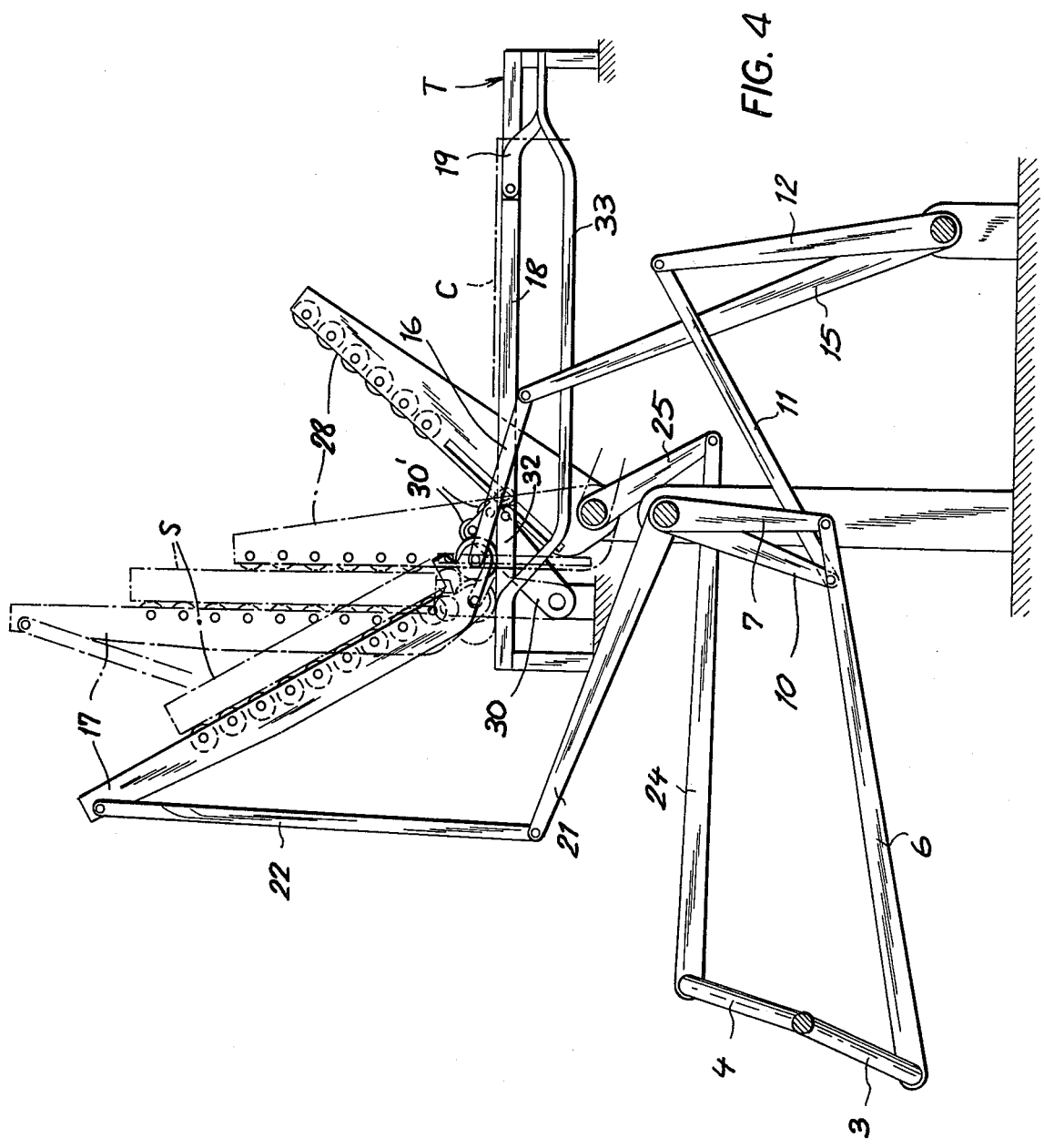

As the cranks 3 and 4 continue to turn, the arm 17 advances further along the upper run 18 on the wheel 20 while the fromt end of the arm is swung upwardly by connecting rod 22, causing the slab S to roll backward against an abutment 23 formed on arm 17 for supporting the slab as the arm approches the vertical position, as shown in FIG. 4. As the arm 17 approaches the vertical position, the wheel 20 passes over and closes a switch 32, formed in the upper run 18, and normally held open by a spring (not shown).

As the arm 17 swings upwardly in a clockwise sense, driven by the lever 25, in a coordinated movement with arm 17, so that both arm reach the vertical position at the same time, the arm 28 making contact with the slab S with rollers 28' provided thereon. Another arm 30 pivoted at 31 is formed with a pin 29 which is entrained in a slot *a* formed in the arm 28, so that as the arm 28 swings into a vertical position, the arm 30 follows, forming an abutment with a pair of rollers 30' provided thereon, at the same level as the abutment 23, for holding the slab S after it is received by arm 28 from arm 17 when that arm passes beyond the vertical position, as shown in FIG. 5.

As the cranks 3 and 4 pass through 180°, the various levers begin to swing back through the second half of the cycle, the wheel 20 of arm 17 being directed to the lower run 33 of track T by the open switch 32, while at the same time, the arm 28 carrying the slab S, swings downwardly to return the slab to conveyer in a turned-over position. As arm 17 returns to its starting point, the wheel 20 passes through a switch 19, as shown in phantom lines in FIG. 5, which is normally held closed by gravity and serves to direct the wheel 20 to the upper run 18 at the start of the cycle.

As can be seen in FIG. 1, the arms and tracks are in pairs which are parallel but spaced apart, each set of arms 17, 28 and 30 and tracks T forming an interleaved group spaced apart from an identical interleaved group, each group having its attendent levers and connecting rods driven by common shafts 8, 26 and 13 which in turn are driven by single levers 7 and 25 and connecting rods 6 and 24 respectively.

FIG. 6 shows an alternate drive group comprising a pair of hydraulic cylinders 3' and 4' having respective piston rods 6' and 24' articulated respectively to levers 7 and 25, the rest of the mechanism being identical to the already described. The cylinders 3' and 4' are swingably mounted in trunnions to compensate for the angular differences encountered during the cycle.

We claim:

1. A lever-operated turn-over device for slabs displaced by a conveyor along a path comprising:

a first pair of movable elongated arms mounted parallel to one another and arranged beneath the path of said conveyor in a horizontal position;

a second pair of swingable elongated arms lying in planes parallel to said first pair of arms;

each of said first pair of arms having a wheel mounted at a first end thereof;

a track engaging each of said wheels and forming a guide therefor;

a drive means articulated to said first end of each of said first pair of arms for moving said arms along said tracks into said conveyor path and engagement with said slab to lift said slab from said conveyor;

another articulation between said drive means and a second end of each of said first pair of arms for swinging said first arms about said wheels into a vertical position and beyond; and a further articulation between said drive means and said second pair of arms for swinging said second pair into a vertical position adjacent said first pair of arms for receiving said slab therefrom and returning said slab to said conveyor in a turned-over position.

2. The device as defined in claim 1 wherein:

said drive means includes a motor coupled to a first crank and a second crank for the simultaneous rotation thereof;

a first connecting rod articulated at one end to said first crank;

a first lever fixedly mounted on a first rotatable shaft and articulated to the other end of said first connecting rod;

a second lever fixedly mounted on said first rotatable shaft;

a second connecting rod articulated at one end to said second lever;

a third lever fixedly mounted on a second rotatable shaft and articulated to the other end of said second connecting rod;

a pair of fourth and fifth levers fixedly mounted on said second rotatable shaft;

a pair of third and fourth connecting rods articulated at one end to said fourth and fifth levers and each rod articulated at the other end to the first end of a respective first arm;

a pair of sixth and seventh levers fixedly mounted on said first rotatable shaft;

a pair of fifth and sixth connecting rods articulated at one end to said sixth and said seventh levers and each of said fifth and sixth rods articulated at the other end to the second end of a respective first arm;

a seventh connecting rod articulated at one end to said second crank;

an eighth lever fixedly mounted on a third rotatable shaft and articulated to the other end of said seventh connecting rod; and said second pair of arms fixedly mounted on said third rotatable shaft.

3. The device as defined in claim 1 wherein:

said pair of tracks are each formed with upper and lower runs;

a first pair of pivoted switches one provided at one end of said tracks and maintained in a closed position by gravity for guiding said wheels of each of said first arms to said upper run during movement of said first arms in one direction and opened by movement of said first arms in the other direction; and a second pair of pivoted switches, one provided at the other end of said tracks and biased in an open position by a spring for guiding said wheels to said lower run of said tracks during movement of each of said first arms in the other direction, said second switches being closeable by the passage of said first arms in the forward direction.

4. The device as defined in claim 1, further comprising:

a third pair of arms, one of them being pivotally mounted adjacent each of said second arms and engaged thereby for movement therewith into a position providing a support for said slab when said second arms are in a near vertical position.

5. The device as defined in claim 4 wherein:

said first pair of arms are each provided with a plurality of rollers for engagement with said slab;

an abutment formed near each of said first ends for support of said slab as said first arms approach a vertical position;

said second pair of arms are each provided with a plurality of rollers for engagement with said slab;

said third pair of arms are each provided with a plurality of rollers for engagement with said slab;

a projecting pin formed on each of said third pair of arms, and a slot formed in each of said second pair of arms for engagement with a respective one of said pins.

6. The device as defined in claim 1 wherein:

said drive means includes a first hydraulic cylinder pivotally mounted on a base and articulated to each of said first and second ends of each of said first pair of arms; and a second hydraulic cylinder pivotally mounted on said base and articulated to said second pair of arms.

* * * * *